US010686491B2

(12) United States Patent
Tarafi et al.

(10) Patent No.: US 10,686,491 B2
(45) Date of Patent: Jun. 16, 2020

(54) METHOD AND DEVICE FOR CANCELLING NOISE FOR 2-WIRE TRANSMISSION SYSTEMS

(71) Applicant: ORANGE, Paris (FR)

(72) Inventors: Rabah Tarafi, Lannion (FR); Fabienne Moulin, Trevou Treguignec (FR); Alain Cario, Lannion (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 16/532,252

(22) Filed: Aug. 5, 2019

(65) Prior Publication Data

US 2019/0363752 A1 Nov. 28, 2019

Related U.S. Application Data

(63) Continuation of application No. 15/532,404, filed as application No. PCT/FR2015/053290 on Dec. 1, 2015, now Pat. No. 10,419,068.

(30) Foreign Application Priority Data

Dec. 2, 2014 (FR) ..................................... 14 61820
Dec. 1, 2015 (WO) ................. PCT/FR2015/053290

(51) Int. Cl.
*H04B 3/30* (2006.01)
*H04L 25/02* (2006.01)
(Continued)

(52) U.S. Cl.
CPC ................. *H04B 3/30* (2013.01); *H04B 1/40* (2013.01); *H04B 3/54* (2013.01); *H04L 25/0266* (2013.01);
(Continued)

(58) Field of Classification Search
CPC ... H04B 1/38; H04B 1/40; H04B 3/00; H04B 3/30; H04L 25/0266; H04L 25/0268;
(Continued)

(56) References Cited

U.S. PATENT DOCUMENTS 4,507,721 A * 3/1985 Yamano ................ H02M 3/335
363/20
6,052,420 A 4/2000 Yeap et al.
(Continued)

FOREIGN PATENT DOCUMENTS

WO 01/50623 A1 7/2001

OTHER PUBLICATIONS

International Search Report for the PCT/FR2015/053290 application dated Feb. 23, 2016.

*Primary Examiner* — Young T Tse
(74) *Attorney, Agent, or Firm* — Haverstock & Owens LLP

(57) ABSTRACT

A method of estimating a noise present on a 2-wire line connected to a modem using a plurality of frequency bands is implemented by a noise estimation device connected to the 2-wire line. The method comprises obtaining a first voltage value of a differential mode voltage at the two wires of the secondary side of the differential mode circuit, the first voltage value measured on the plurality of frequency bands and a second voltage value of a common mode image voltage corresponding to a voltage at the two wires of the secondary side of the common mode circuit, resulting from said differential mode voltage, the second voltage value being measured on the plurality of frequency bands and transmitting the first voltage value and the second voltage value to a calculating module configured to provide a noise estimate based on the first and second voltage values.

7 Claims, 3 Drawing Sheets

Figure 1:
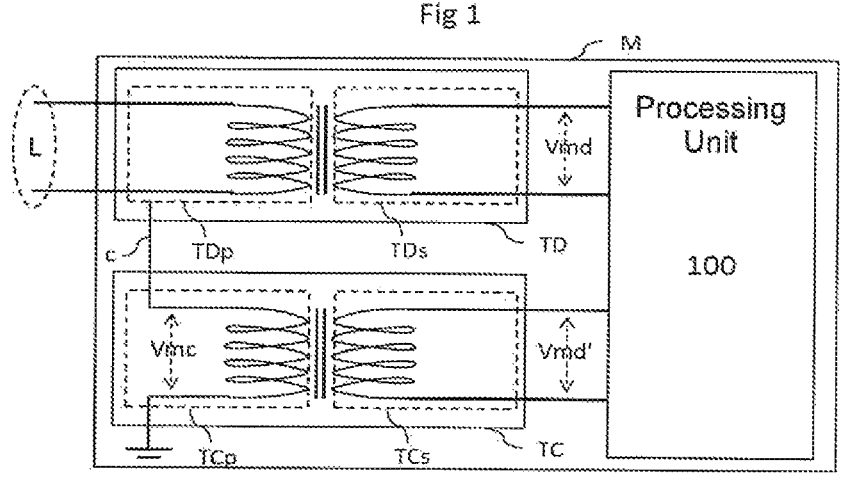

(51) Int. Cl.
    *H04L 25/08*       (2006.01)
    *H04B 3/54*        (2006.01)
    *H04B 1/40*        (2015.01)
    *H02J 13/00*      (2006.01)

(52) U.S. Cl.
    CPC ........ *H04L 25/0272* (2013.01); *H04L 25/085* (2013.01); *H02J 13/00007* (2020.01)

(58) Field of Classification Search
    CPC ............ H04L 25/0272; H04L 25/0278; H04L 25/085; H04J 13/002
    USPC .... 375/219, 220, 222, 257, 258; 333/32, 35, 333/170, 177
    See application file for complete search history.

(56) References Cited

U.S. PATENT DOCUMENTS

| | | | |
|---|---|---|---|
| 2001/0043124 A1* | 11/2001 | Hilliard | ................ G01D 5/2013 331/65 |
| 2005/0053229 A1 | 3/2005 | Tsatanis | |
| 2010/0111202 A1 | 5/2010 | Schlley | |
| 2011/0206104 A1 | 8/2011 | Wiese | |

* cited by examiner

METHOD AND DEVICE FOR CANCELLING NOISE FOR 2-WIRE TRANSMISSION SYSTEMS

RELATED APPLICATION(S)

The present application is a continuation of co-pending U.S. patent application Ser. No. 15/532,404, filed Jun. 1, 2017, and entitled "METHOD AND DEVICE FOR CANCELLING NOISE FOR 2-WIRE TRANSMISSION SYSTEMS," which is hereby incorporated by reference.

FIELD OF THE INVENTION

The invention application is in the field of canceling electromagnetic noises for transmission systems via a pair of copper wires (telephone or electrical), referred to as a 2-wire line, and more particularly the noises coupled in common mode, i.e. affecting the wire pair taken as a whole, and not the noises coupled in differential mode, i.e. affecting one wire of the pair with respect to the other.

PRIOR ART 2-wire transmission systems, for example DSL (Digital Subscriber Line) or PLT (Power Line Transmission) systems, are subjected to electromagnetic interference, which degrades the transmission quality and thus the quality of the services (abnormally weak data rates, untimely disconnections, etc.).

These noises, originating from a source external to the pair of wires (electrical household equipment, elevator motors, trains passing over an electrified railway line, faulty power supplies, etc.), are coupled in common mode, i.e. between the wires and the ground, are converted to a differential mode, i.e. between each wire, and form a parasitic voltage superimposed on the payload signal also transmitted differentially between the two wires.

The published patent application U.S. 2011/0206104 A1 teaches a technique of noise cancellation implemented in a modem, based on the use of two pairs of wires connected to the same modem, and on the assumption that the two pairs are subjected to the same electromagnetic interference. One of the pairs therefore makes it possible to measure the noises in order to subtract them in the time domain from the signal received by the other pair, which signal is made up of the payload signal and the noise.

This method has at least two major disadvantages. It requires the use of two pairs connected to the modem and therefore cannot be used when a single pair arrives at the premises of the customer of the telecommunication service where the modem is located, which is mostly the case.

Moreover, the assumption according to which the noise coupled on the two pairs is identical is an approximation since each pair has a specific conversion thereof between common mode and differential mode. The noise subtracted from the measurement on one pair will not therefore be identical to that present on the transmission pair and superimposed on the payload signal.

One of the aims of the invention is to overcome these disadvantages of the prior art.

DISCLOSURE OF THE INVENTION

The invention improves the situation by means of a method of canceling a noise present in a data signal received on an electric 2-wire line, implemented by a transceiver device including:

a first transformer, called a differential mode circuit, including a primary side and a secondary side, the primary side being connected by two wires to the 2-wire line;

a second transformer, called a common mode circuit, including a primary side and a secondary side, the primary side being connected by a wire to the primary side of the differential mode circuit, and to a ground by another wire;

the method including the following steps during an adjustment stage:

obtaining a first voltage value on the 2-wire line, called a differential mode voltage;

obtaining a second voltage value corresponding to a voltage at the two wires of the secondary side of the common mode circuit, called a common mode image voltage, resulting from said differential mode voltage;

calculating the ratio between the second value and the first value, called a noise conversion ratio;

and the method including the following steps during a cancellation stage, subsequent to the adjustment stage:

receiving the data signal from the 2-wire line;

at the same time as the receiving step, obtaining a third voltage value corresponding to the voltage at the two wires of the secondary side of the common mode circuit;

canceling the noise in the data signal, by subtracting an estimate of the noise, the estimate being calculated by dividing the third value by said conversion ratio.

The solution proposed by the method according to the invention allows the cancellation of the noise from a single wire pair connected to the modem. It takes into account the noise actually coupled on the 2-wire line. This method takes place in two stages: an adjustment stage, during which no so-called payload data is transmitted on the 2-wire line, and a cancellation stage during which the 2-wire line transmits noisy payload data.

During the adjustment stage, the common mode/differential mode conversion is evaluated, based on a noise present on the 2-wire line.

During the cancellation stage, the differential mode noise is calculated from the common mode/differential mode conversion estimated during the adjustment stage, and from a common mode measurement performed dynamically, i.e. during the transmission of the noisy payload signal.

According to one aspect of the invention, the steps of obtaining the adjustment stage are preceded by the following steps:

generating a known adjustment signal, via the transceiver device;

sending the known adjustment signal to the differential mode circuit or to the common mode circuit.

When the ambient noise present in the 2-wire line, i.e. the noise in the absence of data transmission, is of an intensity lower than a certain threshold, the adjustment stage can advantageously use an "artificial" noise, i.e. an adjustment signal specially generated by the transceiver device. An advantage of this aspect is that this adjustment signal is generated expressly with a predetermined voltage value, which is therefore known, and it is therefore not necessary to measure it. Another advantage is that it is possible to carry out the adjustment stage in several different spectral bands, and thus calculate several conversion ratios, each being adapted to a very precise spectrum. The noise cancellation that results from using these various conversion ratios is more accurate.

According to one aspect of the invention, the known adjustment signal is sent to the differential mode circuit.

The voltage of this known adjustment signal then corresponds to the first voltage value, i.e. the differential mode voltage. The adjustment signal is also sent on the 2-wire line which is in alignment with the differential mode circuit.

According to one aspect of the invention, the known adjustment signal is sent to the common mode circuit.

The voltage of this known adjustment signal then corresponds to the second voltage value, i.e. the common mode image voltage. The adjustment signal is not sent on the 2-wire line which is not in alignment with the common mode circuit, which is advantageous when the adjustment signal may disrupt the 2-wire line or equipment connected to the distant end thereof.

Moreover, this method makes it possible to carry out the adjustment stage at all the necessary frequencies, regardless of the level of the ambient noise, also known as common mode noise, present on the 2-wire line. The disadvantage thereof is that it requires a signal sending channel to the common mode circuit, which is not necessary if the adjustment signal is sent to the differential mode circuit.

According to one aspect of the invention, the first value is obtained by measuring at the two wires of one of the sides of the differential mode circuit, and the second value is obtained by measuring at the two wires of one of the sides of the common mode circuit.

When the ambient noise, also known as common mode noise, present in the 2-wire line is of a sufficient intensity, the adjustment stage can advantageously use it and measure the voltage thereof in the common mode circuit and also measure the resulting voltage in the differential mode circuit. It is not necessary for the transceiver device to be capable of generating a special adjustment signal, and the device is simplified thereby.

The various aspects of the noise cancellation method which have just been described can be implemented independently of one another or in combination with one another.

The invention also relates to a transceiver device capable of sending and receiving an electrical signal on a 2-wire line, including:
- a first transformer, called a differential mode circuit, including a primary side and a secondary side, the primary side being connected by two wires to the 2-wire line;
- a second transformer, called a common mode circuit, including a primary side and a secondary side, the primary side being connected by a wire to the primary side of the differential mode circuit, and to a ground by another wire;

and further including the following modules:
- module for obtaining a voltage value on the 2-wire line, called a differential mode voltage;
- module for measuring a voltage value corresponding to a voltage at the two wires of the secondary side of the common mode circuit, called a common mode image voltage, resulting from said differential mode voltage;
- module for calculating the ratio between the second value and the first value, called a noise conversion ratio;
- module for receiving a data signal from the 2-wire line;
- module for canceling the noise in the data signal, by subtracting an estimate of the noise, the estimate being calculated by dividing a common mode image voltage value by said conversion ratio.

The transceiver device according to the invention is capable of implementing the method described above, in all of the embodiments thereof. In particular, the common mode circuit does not change the differential mode voltage obtained at the secondary side of the first transformer and allows the measurement of the common mode image voltage. This device is intended to be implemented, for example, in an xDSL modem.

According to one aspect of the invention, the primary side of the common mode circuit is connected by the wire to the midpoint of the primary side of the differential mode circuit.

Since most of the transformers provide the possibility of an electrical connection at the midpoint thereof, on the primary side and on the secondary side, no additional electronic component is required to connect the common mode circuit to the differential mode circuit.

According to one aspect of the invention, the primary side of the common mode circuit is connected by the wire to a bridge of high impedance resistors, the bridge being connected to each of the two wires of the primary side of the differential mode circuit.

This aspect is an alternative when a connection to the midpoint of the differential mode circuit is not possible.

According to one aspect of the invention, the primary side of the common mode circuit is connected by the wire to a current probe positioned around the two wires of the primary side of the differential mode circuit.

This aspect is another alternative when a connection to the midpoint of the differential mode circuit is not possible.

The invention also relates to a computer program including instructions for implementing the steps of the noise cancellation method which has just been described, when this program is executed by a processor.

Finally, the invention relates to a recording medium, that can be read by a transceiver device for an electrical signal such as, for example, a xDSL modem, on which the program that has just been described is recorded, which can use any programming language, and be in the form of source code, object code, or intermediate code between source code and object code, such as in a partially compiled form, or in any other desirable form.

PRESENTATION OF THE FIGURES

Other advantages and features of the invention will emerge more clearly upon reading the following description of a particular embodiment of the invention, given by way of simple illustrative and non-limiting example, and the appended drawings, wherein:

FIG. 1 schematically shows an example of a transceiver device example implementing the method of canceling a noise present in a data signal received on a 2-wire line, according to the invention.

Figure 2A:
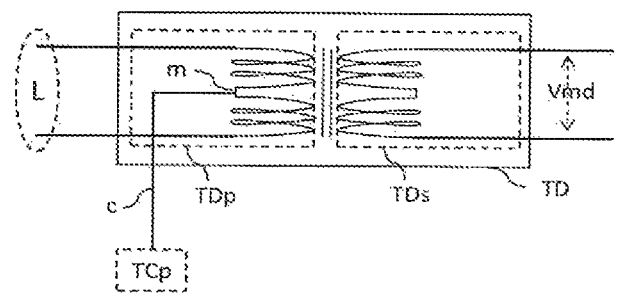
Figure 2B:
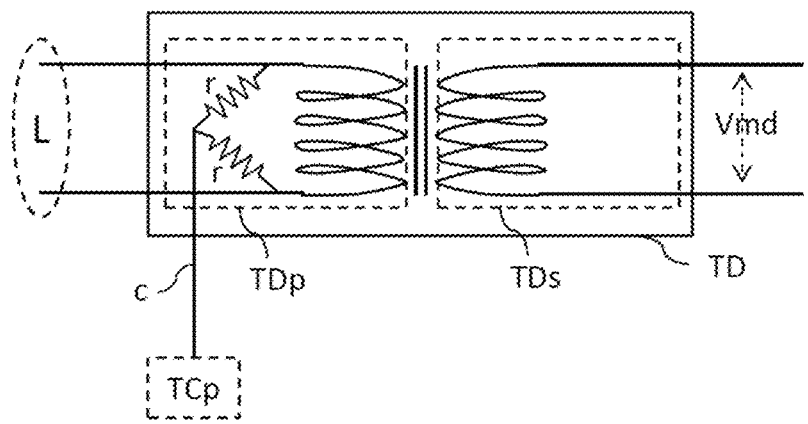
Figure 2C:
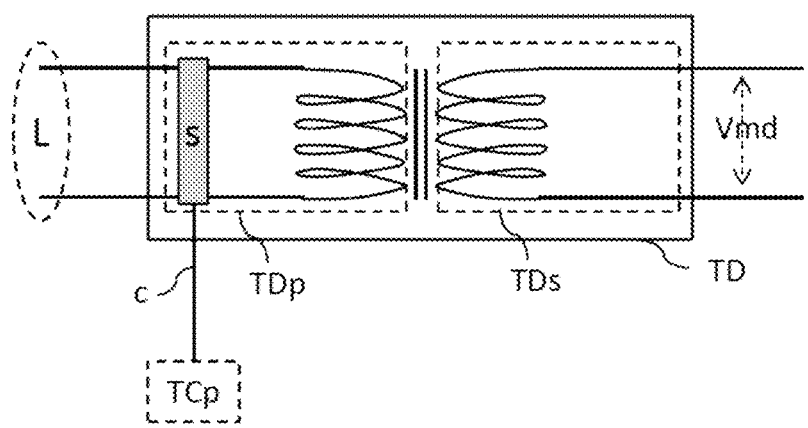

FIGS. 2a, 2b and 2c show an example of implementing the differential mode circuit included in the transceiver device, according to a first, a second and a third embodiment of the connection between the common mode circuit and the differential mode circuit, according to the invention.

Figure 3:
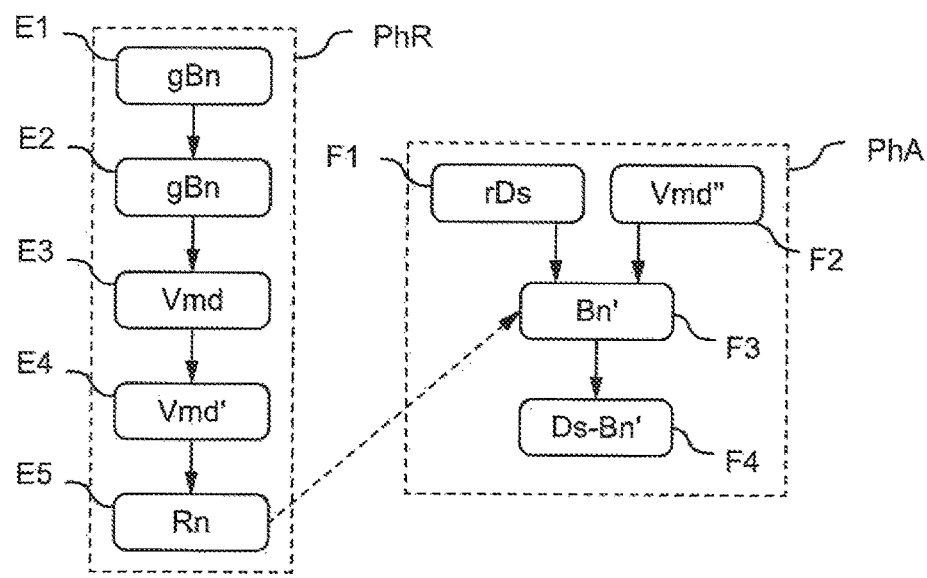

FIG. 3 schematically shows an example of implementing the steps of the method of canceling a noise present in a data signal received on an electric 2-wire line, according to one aspect of the invention.

Figure 4:
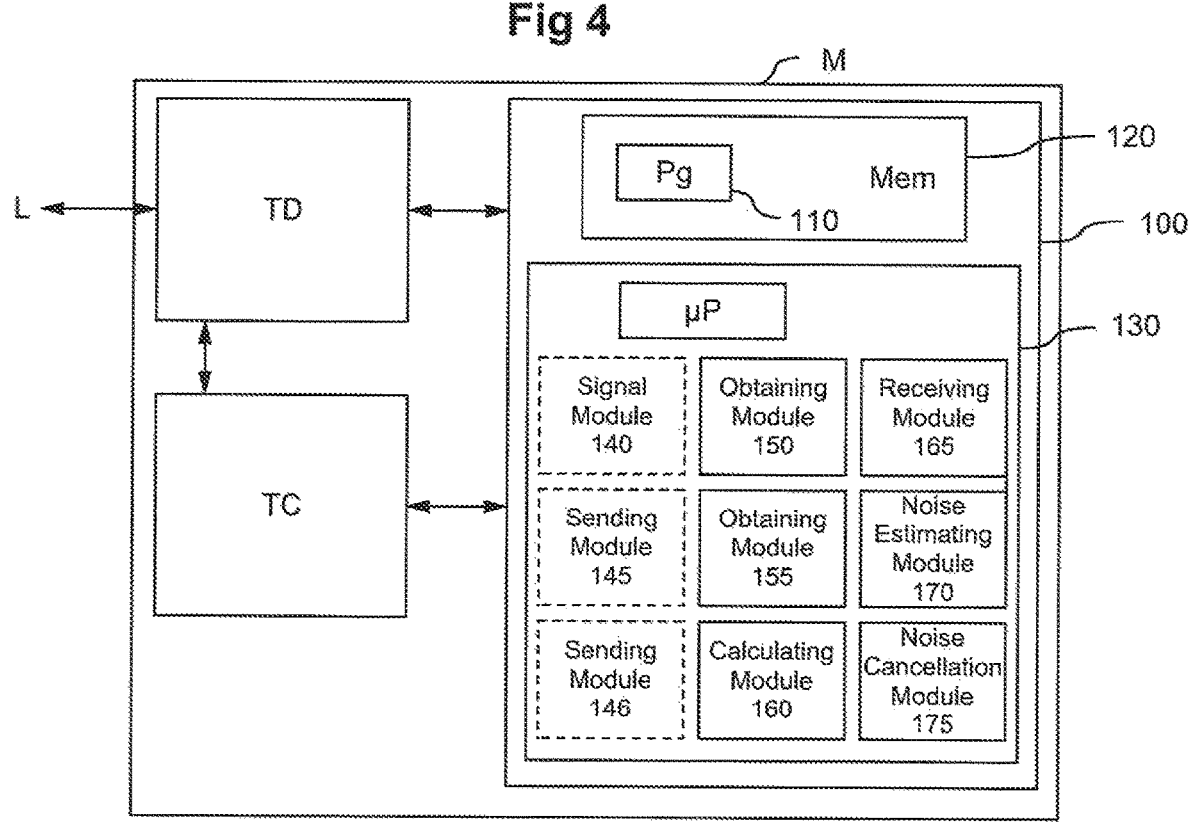

FIG. 4 shows a structure example of the transceiver device, according to one aspect of the invention.

DETAILED DESCRIPTION OF AT LEAST ONE EMBODIMENT OF THE INVENTION

The remainder of the description presents examples of several embodiments of the invention based on a DSL 2-wire transmission system, but the invention is also used for other systems, such as a PLT system.

FIG. 1 schematically shows an example of a transceiver device example implementing the method of canceling a noise present in a data signal received on a 2-wire line, according to the invention.

The device M, which can be a modem, includes a first current transformer TD, and a second current transformer TC. Each of these transformers is connected to a processing unit 100, also called a "chipset", which unit is also included in the modem M.

Like any transformer, the first transformer TD includes a primary side TDp and a secondary side TDs, galvanically isolated from each other. This isolation makes it possible to protect the secondary side TDs, connected to the chipset 100, from any overvoltage affecting the primary side TDp, in particular through the 2-wire line L to which the primary side TDp of the first transformer TD is connected.

Likewise, the second transformer TC includes a primary side TCp and a secondary side TCs, galvanically isolated from each other in order to protect the secondary side TCs, also connected to the chipset 100, from any overvoltage which may affect the primary side TCp, through the primary side TDp of the first transformer TD, to which the primary side TCp of the second transformer TC is connected, via the connection c.

When a voltage exists between the two wires of the primary side of a transformer, a proportional voltage is induced between the two wires of the secondary side, and vice versa.

Thus, when a voltage difference exists between the two wires of the 2-wire line L, a voltage Vmd, called a differential mode voltage, is induced between the two wires of the secondary side TDs of the first transformer TD. It is for this reason that the first transformer TD is also called a "differential mode circuit".

Thanks to the connection c between the second transformer TC and the first transformer TD, when a voltage Vmc, called a common mode voltage, exists between the ground and the first transformer TD, this results in a voltage Vmd' at the secondary side TCs of the second transformer TC. It is for this reason that the second transformer TC is also called a "common mode circuit".

It is understood that, thanks to the arrangement, in the modem M, of the differential mode circuit TD, of the common mode circuit TC and of the chipset 100, the voltages Vmd and Vmd' can be measured at any time by the chipset 100.

In order for the modem M to be able to receive and send signals on the 2-wire line L, the chipset 100 includes a receiving module and a sending module, which are connected to the differential mode circuit TD. In order to be able to measure a common mode noise, the chipset also includes a receiving module connected to the common mode circuit TC. The chipset 100 also includes other modules which will be described with respect to FIG. 4.

FIGS. 2a, 2b and 2c show an example of implementing the differential mode circuit included in the transceiver device, according to a first, a second and a third embodiment of the connection between the common mode circuit and the differential mode circuit, according to the invention.

As shown in FIG. 2a, in the first embodiment, the primary side TCp of the common mode circuit TC is connected by the wire c, i.e. the wire which is not connected to the ground, to the midpoint of the primary side TDp of the differential mode circuit TD.

The advantage of this embodiment is that no additional electronic component is required to connect the common mode circuit to the differential mode circuit. A simple electrical connection is sufficient.

As shown in FIG. 2b, in the second embodiment, the primary side TCp of the common mode circuit TC is connected by the wire c to a bridge of high impedance resistors, each resistor r being, for example, approximately 10 kOhms, the bridge being connected to each of the two wires of the primary side TDp of the differential mode circuit TD.

This is an alternative when it is not possible to connect the midpoint of the primary side TDp of the differential mode circuit TD.

As illustrated in FIG. 2c, in the third embodiment, the primary side TCp of the common mode circuit TC is connected by the wire c to a current probe s, positioned around the two wires of the primary side TDp of the differential mode circuit TD.

This is another alternative when it is not possible to connect the midpoint of the primary side TDp of the differential mode circuit TD.

FIG. 3 schematically shows an example of implementing the steps of the method of canceling a noise present in a data signal received on an electric 2-wire line, according to one aspect of the invention.

The method includes two stages separated temporally: an adjustment stage PhR, during which a conversion ratio is calculated, and a noise cancellation stage PhA proper, using the calculated conversion ratio to estimate the noise to be subtracted from a received data signal.

The adjustment stage PhR can be carried out in several embodiments.

In a first embodiment of the method for noise cancellation according to the invention, the adjustment stage PhR includes the steps E1-E5.

During a step E1, the chipset 100 of the modem generates an adjustment signal Bn with an energy and in a frequency band which are known.

During a step E2, the known adjustment signal Bn is sent from the chipset 100 to the differential mode circuit TD, and therefore to the 2-wire line L. This adjustment signal must therefore not present, for the 2-wire line L and the equipment connected thereto at the distant end, interference which could hamper the provision of services to users.

During a step E3, a voltage value on the 2-wire line, called a differential mode voltage Vmd, is obtained, by simple knowledge of the adjustment signal Bn by the chipset 100 which sent it. Alternatively, the value can be obtained by measuring this voltage between the two wires of the secondary side TDs of the differential mode circuit TD. Since the electrical continuity of these wires extends into the chipset 100, the measurement can also be performed at the chipset 100.

This differential mode voltage Vmd results in a voltage at the two wires of the secondary side TCs of the common mode circuit TC, called a common mode image voltage Vmd'.

During a step E4, the value of the common mode image voltage Vmd' is obtained. Since the electrical continuity of the wires of the secondary side TCs extends into the chipset 100, this value can be obtained by measuring the voltage between these wires at the chipset 100.

During a step E5, the ratio is calculated between the second value, i.e. the common mode image voltage Vmd', and the first value, i.e. the differential mode voltage Vmd. This ratio is called a noise conversion ratio Rn.

In a second embodiment of the method for noise cancellation according to the invention, the steps E1 and E2 are not carried out. If an ambient noise Ba exists naturally on the 2-wire line L, it may be sufficiently energetic to make the generation of an adjustment signal Bn by the chipset, in the frequency bands used, useless or impossible. In this case, the value of the differential mode voltage Vmd of the step E3 is obtained by measuring the voltage between the two wires of the secondary side TDs of the differential mode circuit TD. The steps E4 and E5 are carried out in an identical manner to the first embodiment of the method. The energy of the ambient noise Ba can be measured periodically by the chipset which decides whether the steps E1 and E2 are carried out or not depending on a threshold being exceeded.

It is possible and advantageous, in some cases, to combine the first and the second embodiment of the noise cancellation method. Indeed, the characteristics of the ambient noise are random and the ambient noise does not necessarily have sufficient energy in all the frequency bands used, for which the noise conversion ratio Rn cannot therefore be reliably estimated. The execution of the method according to the first embodiment with an adjustment signal Bn in these frequency bands, in addition to the second embodiment using the ambient noise Ba, can then compensate for this shortcoming.

In a third embodiment of the method for noise cancellation according to the invention, the adjustment signal Bn is sent from the chipset 100 to the common mode circuit TC, and not to the differential mode circuit TD. This can be advantageous if it is necessary to prevent the adjustment signal Bn from being sent on the 2-wire line L, or when the ambient noise Ba already present on the line cannot be used by the second embodiment of the method, for example as it is too random.

This third embodiment requires that the chipset 100 includes a sending module, connected to the common mode circuit TC, in addition to the receiving module already mentioned, such that the adjustment signal Bn can be sent from the chipset 100 to the common mode circuit TC.

In this alternative, the steps E2, E3 and E4 are replaced by steps E2', E3' and E4', respectively.

During the step E2', the adjustment signal Bn is sent from the chipset 100 to the common mode circuit TC.

This adjustment signal Bn results in a voltage at the two wires of the secondary side TDs of the differential mode circuit TD, called a differential mode voltage Vmd.

During a step E3', a voltage value on the 2-wire line, called a differential mode voltage Vmd, is obtained, by measuring this voltage between the two wires of the secondary side TDs of the differential mode circuit TD. Since the electrical continuity of these wires extends into the chipset 100, the measurement can also be performed at the chipset 100.

During a step E4', the value of the common mode image voltage Vmd' is obtained, by simple knowledge of the adjustment signal Bn by the chipset 100 which sent it. Alternatively, the value can be obtained by measuring this voltage between the two wires of the secondary side TCs of the differential mode circuit TC. Since the electrical continuity of the wires of the secondary side TCs extends into the chipset 100, this measurement can be carried out at the chipset 100.

In the first and the second embodiments described above, all of the steps are repeated iteratively as many times as there are frequency bands used in the data signals transmitted on the line L. An adjustment signal Bn corresponds to each frequency band, as does a noise conversion ratio Rn, with n ranging from 1 to the number of frequency bands.

The noise cancellation stage PhA includes the steps F1-F4, and uses the same adjustment signal Bn frequency bands and the same noise conversion ratios Rn as the adjustment stage immediately preceding the noise cancellation stage.

During a step F1, a data signal rDs is received by the modem M from the 2-wire line L. This signal passes through the differential mode circuit TD in order to arrive in the chipset 100.

During a step F2 which is simultaneous with the step F1, a value of the common mode image voltage Vmd" is obtained by measuring this voltage between the two wires of the secondary side TCs of the common mode circuit TC. Since the electrical continuity of these wires extends into the chipset 100, the measurement can also be performed at the chipset 100.

During a step F3, a noise Bn' is estimated by dividing the voltage Vmd" by the conversion ratio Rn.

Finally, during a step F4, the noise in the received data signal rDs is canceled by subtracting the estimated noise Bn'.

It is understood that the correct operation of the noise cancellation stage, i.e. the absence of noise in the data signal received after carrying out the method, is dependent upon on the quality of the conversion ratio Rn calculated during the adjustment stage. The adjustment stage must therefore be repeated if the electromagnetic environment conditions of the line change, and especially if the line becomes unstable, i.e. if transmission errors or synchronization losses occur, or if no data signal is received for an abnormally long period. The manner of detecting these phenomena is known.

With respect to FIG. 4, a structure example for the transceiver device, according to one aspect of the invention, is now presented.

The transceiver device M, or modem M, implements the noise cancellation method, various embodiments of which have just been described. Such a modem M can be, for example, a xDSL modem operating for a 2-wire transmission system using any type of DSL technique (ADSL, VDSL, etc.).

FIG. 1 has already shown that the modem M includes a differential mode circuit TD, a common mode circuit TC, and a processing unit 100, or chipset 100, and the manner in which these components can be connected to one another inside the modem M.

For example, the chipset 100 includes a processing unit 130, provided, for example, with a microprocessor µP, and controlled by a computer program 110, which program is stored in a memory 120 and implements the noise cancellation method according to the invention. At initialization, the code instructions of the computer program 110 are, for example, loaded into a RAM memory, before being executed by the processor of the processing unit 130.

Such a chipset 100 includes:
  an obtaining module 150, capable of obtaining a voltage value on the 2-wire line L, corresponding to a voltage at the two wires of the secondary side TDs of the differential mode circuit TD, called a differential mode voltage Vmd;
  an obtaining module 155, capable of obtaining a voltage value corresponding to a voltage at the two wires of the secondary side TCs of the common mode circuit TC, called a common mode image voltage, Vmd' or Vmd";
  a calculating module 160, capable of calculating a ratio between the value of the common mode image voltage Vmd', and the value of the differential mode voltage Vmd, said ratio being called a conversion ratio Rn;

a receiving module 165, capable of receiving a data signal from the 2-wire line L, through the differential mode circuit TD;

a noise estimating module 170, capable of estimating a noise Bn' by calculating a division of a value of the common mode image voltage Vmd" by the conversion ratio Rn;

a noise cancellation module 175, capable of canceling the noise in the data signal by subtracting therefrom the estimate of the noise Bn'.

Advantageously, the chipset 100 can also include:

a signal generating module 140, capable of generating an adjustment signal Bn of predetermined and known characteristics;

a module 145 for sending the adjustment signal, capable of sending the adjustment signal Bn to the differential mode circuit TD;

a module 146 for sending the adjustment signal, capable of sending the adjustment signal Bn to the common mode circuit TC.

The modules described with respect to FIG. 4 can be hardware or software modules.

The exemplary embodiments of the invention which have just been presented are only some of the possible embodiments.

The invention claimed is:

1. A method of estimating a noise present in a data signal received on a 2-wire line using a plurality of frequency bands, the method being implemented by a transceiver device connected to the 2-wire line, the transceiver device comprising:
a first transformer or a differential mode circuit, including a primary side connected to the 2-wire line, and a secondary side;
a second transformer or a common mode circuit, including a primary side having a first wire connected to the primary side of the differential mode circuit, and another wire connected to a ground, and a secondary side; and
a processing circuit coupled to the secondary side of the first transformer and the secondary side of the second transformer;
the method including the following steps:
obtaining, by the processing circuit:
a first voltage value of a differential mode voltage at two wires of the secondary side of the differential mode circuit, the first voltage value being measured on the plurality of frequency bands, and
a second voltage value of a common mode image voltage corresponding to a voltage at two wires of the secondary side of the common mode circuit, resulting from said differential mode voltage, the second voltage value being measured on the plurality of frequency bands; and
transmitting the first voltage value and the second voltage value to a calculating module of the processing circuit configured to provide a noise estimate based on the first and second voltage values.

2. The method of estimating the noise present as claimed in claim 1, wherein the first voltage value is obtained by measuring at the two wires of the secondary side of the differential mode circuit, and wherein the second voltage value is obtained by measuring at the two wires of the secondary side of the common mode circuit.

3. A transceiver device for estimating a noise present in a data signal received on a 2-wire line using a plurality of frequency bands, the transceiver device comprising:
a first transformer or a differential mode circuit, including a primary side connected by two wires to the 2-wire line, and a secondary side;
a second transformer or a common mode circuit, including a primary side having a first wire connected to the primary side of the differential mode circuit, and another wire connected to a ground, and a secondary side; and
a processing circuit coupled to the secondary side of the first transformer and the secondary side of the second transformer;
wherein the processing circuit comprises:
a circuit configured to obtain:
a first voltage value of a differential mode voltage at two wires of the secondary side of the differential mode circuit, the first voltage value being measured on the plurality of frequency bands, and
a second voltage value of a common mode image voltage corresponding to a voltage at two wires of the secondary side of the common mode circuit, resulting from said differential mode voltage, the second voltage value being measured on the plurality of frequency bands; and
a circuit configured to transmit the first voltage value and the second voltage value to a calculating module configured to provide a noise estimate based on the first and second voltage values.

4. The transceiver device as claimed in claim 3, wherein the primary side of the common mode circuit is connected by the first wire to the midpoint of the primary side of the differential mode circuit.

5. The transceiver device as claimed in claim 3, wherein the primary side of the common mode circuit is connected by the first wire to a bridge of high impedance resistors, the bridge being connected to the 2-wire line of the primary side of the differential mode circuit.

6. The transceiver device as claimed in claim 3, wherein the primary side of the common mode circuit is connected by the first wire to a current probe positioned around the 2-wire line of the primary side of the differential mode circuit.

7. A non-transitory computer readable medium storing instructions which, when executed by a processor perform a method of estimating a noise present in a data signal received on a 2-wire line using a plurality of frequency bands, the method being implemented by a transceiver device connected to the 2-wire line, the transceiver device comprising:
a first transformer or a differential mode circuit, including a primary side connected by the 2-wire line, and a secondary side;
a second transformer or a common mode circuit, including a primary side having a first wire connected to the primary side of the differential mode circuit, and another wire connected to a ground, and a secondary side; and
a processing circuit coupled to the secondary side of the first transformer and the secondary side of the second transformer;
the method including the following steps:
obtaining, by the processing circuit:
a first voltage value of a differential mode voltage at two wires of the secondary side of the differential mode circuit, the first voltage value being measured on the plurality of frequency bands, and a second voltage value of a common mode image voltage corresponding to a voltage at two wires of the secondary side of the common mode circuit, resulting from said differential mode voltage, the second voltage value being measured on the plurality of frequency bands; and transmitting the first voltage value and the second voltage value to a calculating module of the processing circuit configured to provide a noise estimate based on the first and second voltage values.

\* \* \* \* \*